United States Patent [19]

Pauget et al.

[11] Patent Number: 5,577,207
[45] Date of Patent: Nov. 19, 1996

[54] SYSTEM AND METHOD FOR CONNECTING SCSI UNITS SPACED AT DISTANCE WHICH IS GREATER THAN THE STANDARD MAXIMUM LENGTH VALUE OF THE SCSI PROTOCOL

[75] Inventors: Edouard Pauget, Les Clayes Sous Bois; Christian Mollard, La Celle Saint Cloud, both of France

[73] Assignee: Bull S.A., Paris, France

[21] Appl. No.: 460,629

[22] Filed: Jun. 2, 1995

Related U.S. Application Data

[63] Continuation of Ser. No. 24,443, Mar. 1, 1993, abandoned.

[30] Foreign Application Priority Data

Nov. 24, 1992 [FR] France ................... 92 14110

[51] Int. Cl.$^6$ ................................. G06F 13/00
[52] U.S. Cl. ............. 395/200.02; 395/728; 364/222.2; 364/284.3; 364/284.4; 364/DIG. 1
[58] Field of Search .................. 395/200.01, 200.02, 395/200.03, 821, 726, 727, 728; 370/85.12

[56] References Cited

U.S. PATENT DOCUMENTS

| | | | |
|---|---|---|---|
| 4,835,674 | 5/1989 | Collins et al. | 364/200.02 |
| 4,864,291 | 9/1989 | Korpi | 370/85.1 |
| 4,985,830 | 1/1991 | Atac et al. | 364/200.15 |
| 5,237,695 | 8/1993 | Skokan et al. | 395/200.06 |
| 5,239,632 | 8/1993 | Larner | 395/366 |
| 5,257,385 | 10/1993 | Roskowski et al. | 395/738 |
| 5,274,783 | 12/1993 | House et al. | 395/281 |
| 5,301,283 | 4/1994 | Thacker et al. | 395/296 |

*Primary Examiner*—Thomas C. Lee
*Assistant Examiner*—Moustafa Mohamed Meky
*Attorney, Agent, or Firm*—Kerkam, Stowell, Kondracki & Clarke, P.C.; Edward J. Kondracki

[57] ABSTRACT

A system of a maximum of N units (A, B, C, D, . . .) distributed in a network (RE) operating by a predetermined protocol (SCSI) by which the length of any bus ($SCSI_1$, $SCSI_2$, $SCSI_3$) assuring the connection of a plurality of units among one another has a given maximum value, characterized in that, since the distance between the units is greater than the maximum value, it includes a plurality of local partial buses ($SCSI_1$–$SCSI_3$) that are connected to one another via bidirectional point-to-point links ($LPP_1$, $LPP_2$) and are managed by intermediate transmission devices ($DIT_1$, $DIT_{21}$, $DIT_{23}$, $DIT_3$), each of which is connected both to a partial bus and to a point-to-point link and intervenes in the phases of gaining control of the network on the part of any unit connected to any one of the partial buses.

3 Claims, 7 Drawing Sheets

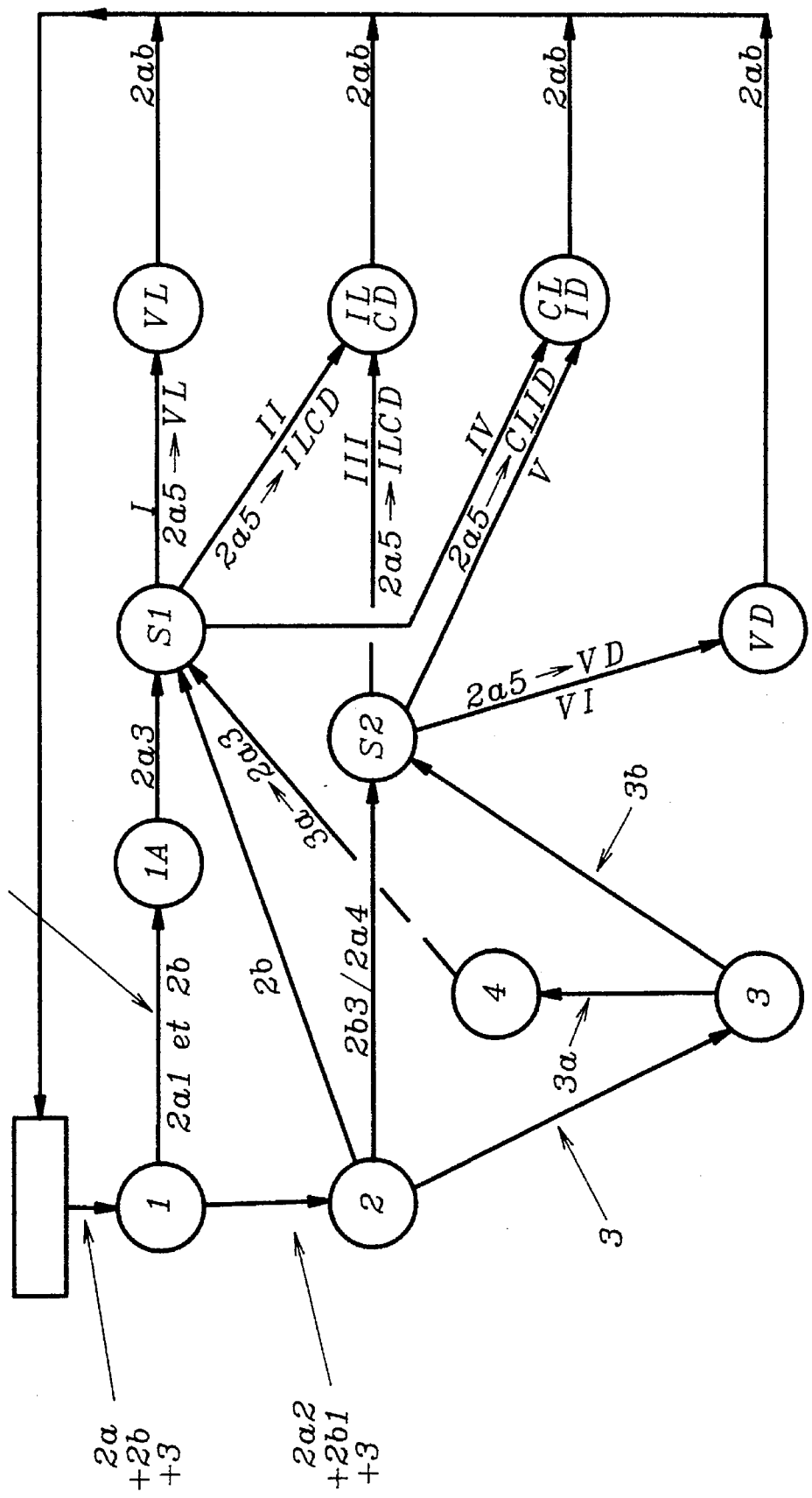

SYSTEM AND METHOD FOR CONNECTING SCSI UNITS SPACED AT DISTANCE WHICH IS GREATER THAN THE STANDARD MAXIMUM LENGTH VALUE OF THE SCSI PROTOCOL

This application is a continuation of application Ser. No. 08/024,443, filed Mar. 1, 1993, now abandoned.

The present invention relates to a system of a maximum of N units distributed in a network operating by a predetermined protocol, in which the length of each bus that assures the connection of several units among one another has a given maximum value. More particularly, it is applicable to a network operating by an SCSI protocol, in which the specified maximum length of a bus is limited.

A "unit" is understood to mean any equipment that uses an SCSI bus as a means of communication with other equipment. An item of equipment of this kind will hereinafter be called an SCSI unit or simply a unit.

The SCSI-type protocol is used for transmission connections that connect SCSI units (such as computers, peripherals, etc.) to one another. Such a protocol is standardized both by the American National Standards Institute (ANSI), under standard X3T9.2, and by the International Standards Organization (ISO).

Under this protocol, the physical transmission medium of the connection is constituted by a bus of the parallel type.

FIG. 1 shows one such bus BS, to which a maximum of N SCSI units, here numbered from 1 through N, are connected.

The trend in information processing systems is toward the use of increasingly more stations, terminals, central processing units, and peripherals in the same system. In order for these various elements, which are often far away from one another, to be connected to one another, they are connected to the same network. This often means that such computer peripherals as disk memories are available at distances far greater than the maximum length of the bus BS.

The present invention makes it possible to connect a plurality of SCSI units to one another, by constituting a system distributed in a network in which the SCSI standard concerning the maximum bus length is adhered to. This is achieved by using a plurality of partial buses, each of which has a maximum length authorized by the standard.

According to the invention, the system of a maximum of N units distributed in a network operating by a predetermined protocol by which the length of any bus assuring the connection of a plurality of units among one another has a given maximum value, is characterized in that, since the distance between the units is greater than the maximum value, it includes a plurality of local partial buses that are connected to one another via bidirectional point-to-point links and are managed by intermediate transmission devices, each of which is connected on the one hand to a partial bus and on the other to a point-to-point link and intervenes in the phases of gaining control of the network on the part of any SCSI unit connected to any one of the partial buses and assigned a predetermined degree of priority for gaining control of the network.

Further characteristics and advantages of the present invention will become apparent in the ensuing description, given by way of non-limiting example and taken in conjunction with the drawings.

In these drawings:

FIG. 8 shows different possible states are of a state machine belonging to an intermediate transmission device like those of FIG. 4, for each of the operations illustrated in FIGS. 5, 6 and 7.

Figure 1:
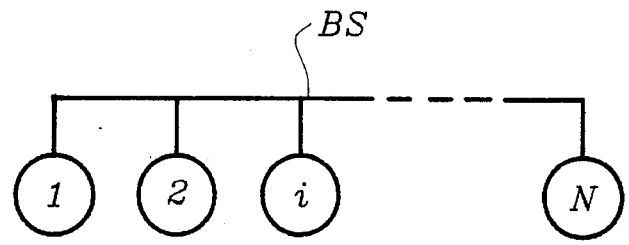
FIG. 1 illustrates how a bus of the SCSI type is constituted in accordance with the standard.
Figure 2:
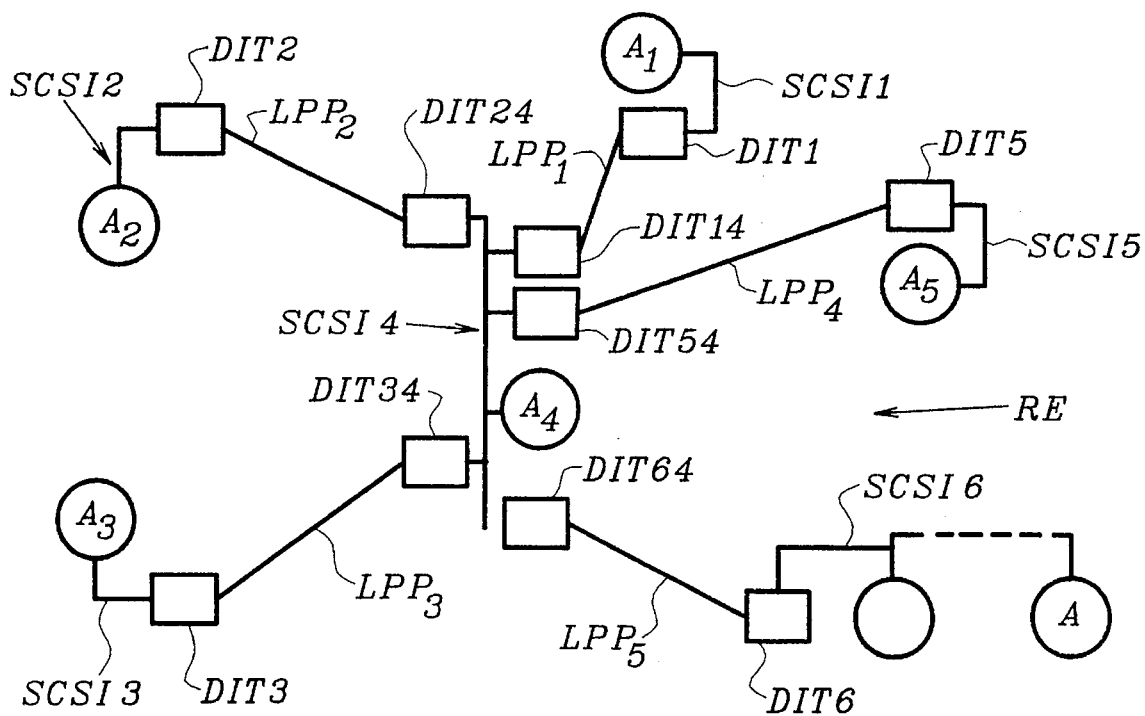
FIG. 2 shows the various essential constituent elements of the system of SCSI units distributed in a network according to the invention.

Turning to FIG. 2, the various essential constituent elements of a system according to the invention are seen. These elements are the following:

— the partial buses $SCSI_1$–$SCSI_6$, whose maximum length is 25·m;

— the SCSI units $A_1$–$A_6$, the unit $A_1$ being connected to the bus $SCSI_1$, $A_2$ being connected to the partial bus $SCSI_2$, $A_3$ to the partial bus $SCSI_3$, $A_4$ to the partial bus $SCSI_4$, $A_5$ to the partial bus $SCSI_5$, and $A_6, \ldots, A_n$ to the partial bus $SCSI_6$, — the intermediate transmission devices $DIT_1$, $DIT_2$, $DIT_3$, $DIT_5$, $DIT_6$, $DIT_{14}$, $DIT_{24}$, $DIT_{34}$, $DIT_{54}$, $DIT_{64}$;

the point-to-point bidirectional links ($LPP_1$–$LPP_5$).

As can be seen from FIG. 2, the intermediate transmission device $DIT_1$ is connected both to the partial bus $SCSI_1$ and to the bidirectional link $LPP_1$. Similarly, $DIT_2$ is connected both to the partial bus $SCSI_2$ and to the bidirectional link $LPP_2$. $DIT_3$ is connected both to the partial bus $SCSI_3$ and to the bidirectional link $LPP_3$, and $DIT_6$ is connected both to the partial bus $SCSI_6$ and to the bidirectional link $LPP_5$, and $DIT_5$ is connected both to the partial bus $SCSI_5$ and to the bidirectional link $LPP_4$. Moreover, all the intermediate transmission devices $DIT_{14}$, $DIT_{24}$, $DIT_{34}$, $DIT_{54}$, $DIT_{64}$ are connected respectively to the partial bus $SCSI_4$ and to the links $LPP_1$, $LPP_2$, $LPP_3$, $LPP_4$, $LPP_5$. Each of the point-to-point bidirectional links $LPP_1$–$LPP_5$ may use any physical transmission media that can transmit signals reliably and at a sufficiently high transfer rate in both directions. These transmission media may be of the multi-wire, coaxial cable, fiber optic, or other type.

In this network, as shown in FIG. 2, the number of SCSI-type units is between 2 and N, as is the number of partial buses, while the number of LPP-type links is between 1 and N–1. It can also be seen that the intermediate transmission devices are always disposed between one partial bus SCSI and one point-to-point LPP-type link.

From the standpoint of the partial bus $SCSI_1$ and the transmission device $DIT_1$, the unit $A_1$ connected to this same partial bus is considered to be a local unit, while every other unit connected to any of the other partial buses, that is, $SCSI_2$–$SCSI_5$, is considered to be a distant unit. Hence unit $A_5$ is considered to be a distant unit for the transmission device $DIT_1$ and for the partial bus $SCSI_1$.

Any unit connected to any of the partial buses $SCSI_1$, $SCSI_5$ is understood to be exactly the same type as any unit connected to a standard SCSI-type bus. Hence for each of the partial buses $SCSI_1$–$SCSI_5$, the SCSI standard is adhered to. It will be recalled that by the SCSI protocol, each unit $A_1$, $A_i, \ldots, A_n$ is identified by an identification number used in the phases of arbitration and selection that are provided by this standard. According to the standard, when any unit A seeks to use a bus SCSI in order to communicate with some other unit $A_i$, it first passes through an arbitration phase and then a selection (or reselection) phase. During the selection (or reselection) phase, the connection between the unit A and the unit $A_i$ is made. The bus SCSI is called BUSY during the entire time required for the transaction between the two units. At the end of the transaction, the bus SCSI is released (in a manner indicated in the standard).

It is also known that three main types of SCSI parallel bus exist. The first type includes eight data bits and one parity bit, the second type 16 data bits and two parity bits, and the third type 32 data bits and four parity bits. Moreover, it is a feature common to these three types of SCSI bus that each has nine control bits, regardless of the width of the data bus (that is, whether it is 8, 16 or 32 bits wide, in the last of these cases having additional control bits). The exact nature of the control bits is set forth in Appendix 1.

A unit which has a predetermined identity, for example identity 7, introduces itself by activating the data line corresponding to its degree of priority; this both identifies it and gives it its degree of priority at the same time. Hence a unit of identity 7 has the degree of priority 7, which is the highest degree of priority. The attribution of the identity and the priority is physically done for a given network configuration at the time the corresponding unit is connected to the network; accordingly, this is accomplished at the time this unit is installed and cannot be changed, once this configuration is set.

For the ensuing description, it will be assumed for the sake of simplicity that the partial buses $SCSI_1$–$SCSI_5$ of FIG. 2 are buses of the first type, that is, buses with eight data bits. In this case, N=8. The identification of each of the N units is represented by the respective data signals 0–7, represented by the symbols $DID_0$–$DID_7$ with an ascending priority, the priority being lowest for $DID_0$ and highest for $DID_7$.

Each partial bus is a normal SCSI-type bus conforming to the standard, to which the following are connected:
—from 1 to N–1 SCSI-type units, of the initiator and/or target type;
—from 1 to N–1 intermediate transmission devices DIT.
With respect to a particular DIT:
—A partial bus is called a LOCAL BUS if the intermediate transmission device DIT is connected to it without any intermediary. Hence for the intermediate transmission device $DIT_1$, the partial bus $SCSI_1$ is a local bus.
—A partial bus is called a DISTANT BUS if at least one point-to-point link LPP separates the partial bus and the intermediate transmission device DIT. Hence for the device $DIT_1$, any one of the partial buses $SCSI_2$–$SCSI_5$ is a DISTANT BUS.

Figure 3:
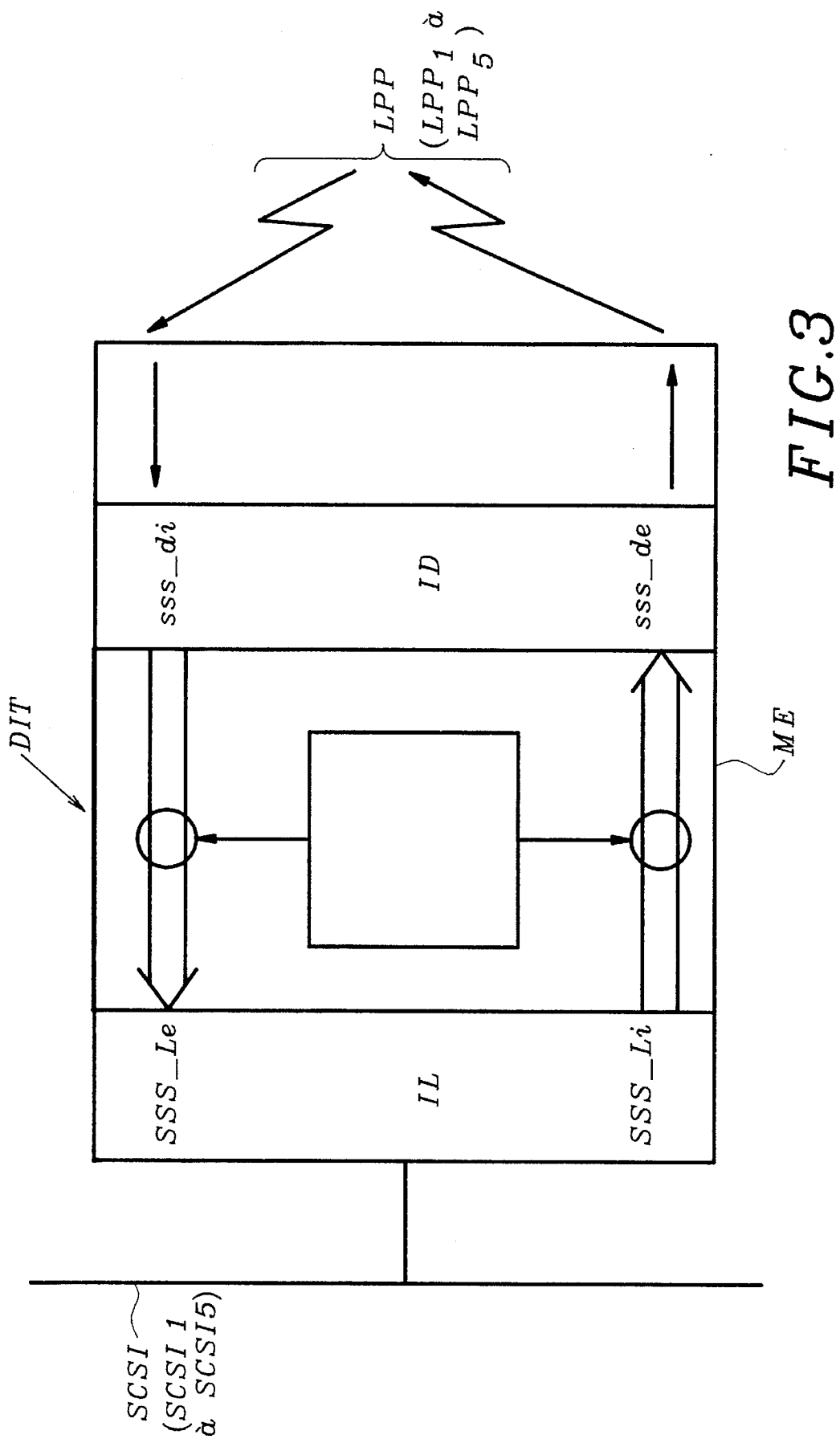
FIG. 3 shows how an intermediate transmission device belonging to the system of the invention is constituted.

Turning to FIG. 3, the essential constituent elements are shown for an intermediate transmission device DIT, such as any one of the intermediate transmission devices $DIT_1$–$DIT_3$, $DIT_5$, $DIT_6$, $DIT_{14}$–$DIT_{34}$, and $DIT_{54}$ and $DIT_{64}$ in FIG. 2. This intermediate transmission device DIT essentially includes a distant interface ID, a local interface IL, with a central portion formed by a state machine ME. It is understood that the DIT includes memorization means, not shown for the sake of simplification, which are disposed between IL and ME on the one hand and ID and ME on the other, for the signals that enter and leave the DIT.

The local interface IL is connected to the local bus SCSI (for example, one of the partial buses $SCSI_1$–$SCSI_5$). The distant interface ID is connected to the point-to-point link LPP (which is any one of the links $LPP_1$–$LPP_5$). The interface IL is a physical connection interface meeting the SCSI standard, while the interface ID is a physical connection interface in accordance with the conventional rules or standards for use of the corresponding link. The state machine ME is connected on the one hand to the local interface IL and on the other hand to the distant interface ID. The set of signals received by the distant interface ID, by way of the link LPP, is called SSS-di, while the set of signals that are output by the DIT by way of this same distant interface ID to the distant buses, by way of LPP is called sss-de. The set of signals output by the local interface IL to the partial bus SCSI is called SSS-Le. The set of signals transmitted by the local interface IL to the distant interface ID, under the control of the state machine ME, is called SSS-Li. The letter d stands for distant, the letter i indicates that it applies to reception, the letter e refers to output, and the letter L means local. The signals arriving at a distant interface or departing from a distant interface for distant buses are written in lower case letters, while the signals arriving at or departing from a local interface are written in upper-case letters. More generally, all the signals that are under control of the state machine ME are listed in detail in Appendix 1.

The intermediate transmission device DIT has four principal functions, which are as follows:
a) the transmission or reception of signals to the link LPP, by means of the distant interface ID,
b) the transmission of signals from the local bus SCSI to the transmission portion of the point-to-point link LPP; this involves the transmission of signals from the local interface to the distant interface, represented by the wide arrow located at the bottom of FIG. 3, between the signals SSS-Li and sss-de;
c) the transmission from the reception portion of the distant interface ID to the local SCSI bus; this involves the transmission from the distant interface to the local interface represented symbolically by the arrow at the top of FIG. 3 at the signals sss-di and SSS-Le;
d) the management of the taking of control of the network on the part of one of the SCSI-type units, by a procedure which will be described hereinafter in conjunction with the operation of the state machine ME.

The management of taking control of the network is done in the intermediate transmission device DIT, by the state machine ME, and proceeds as a function of the state of the signals that arrive at both the local interface IL and the distant interface ID.

This management of the taking of control of the network by the state machine of any one of the intermediate transmission devices of FIG. 2 is based on the rule of arbitration and selection defined in the SCSI standard, with the addition of certain particular properties that become necessary because the propagation time of the signals in the network is lengthened by breaking up the transmission link into a plurality of partial buses $SCSI_1$–$SCSI_{15}$.

It is known that by the rule of arbitration defined in the SCSI standard, any unit Ai which at a given moment seeks to take control of the bus to which it is connected announces itself by activating its signal BUSY (this signal will hereinafter be called $BSY_i$-Li) and its identification datum signal $DID_i$, for a period of time defined by the standard in question. Each unit connected to the bus that observes an identification signal whose priority is greater than that of its own identification signal is required to stop participating in the arbitration phase by deactivating its signal $BSY_i$-Li and its identification datum signal $DID_i$.

In the system of units distributed in a network according to the invention, the rule of arbitration defined in the SCSI standard cannot be applied to the entire network, because of the transmission time for signals output by any unit of the network to any other unit connected to it.

The essential rules that govern the system according to the present invention are as follows:

1) The arbitration as defined in the SCSI standard is used locally at the level of each partial SCSI-type bus: this is because the intermediate transmission device DIT is interposed between this partial bus and each point-to-point link, and this transmission device is provided with intelligence that enables it to meet the rules defined by the SCSI standard, the intelligence being contained in the state machine.

2) Each DIT detects the beginning of an arbitration phase, then acts upon its local interface to neutralize any real SCSI unit that might wish to take control of the network.

3a) When the real unit SCSI assigned priority 7 (the highest under the SCSI standard) participates in the arbitration phase, it nevertheless takes control of the bus and initiates the selection phase, by outputting a selection signal that will be called either SELEC or SEL in the following description.

3a1) Each DIT which detects the beginning of the selection phase stops acts upon its local interface and becomes neutral with respect to the selection, thus allowing the transmission of this selection signal from one of its interfaces to the other.

3b) When the real unit SCSI assigned the priority 7 is not participating in the arbitration phase, each DIT, while neutralizing its own partial bus (forbidding control of the bus to any unit), observes a predetermined delay during which it memorizes the identity of the units seeking to take control of the network.

3c) At the end of this delay, only one of the partial buses of the network is released, one which has been recognized as being connected to the unit participating in the arbitration phase and having the highest priority (other than 7) during that phase.

3d) Any unit located along this partial bus can then make a new attempt to take control of the bus, which if it becomes effective is translated into a propagation of the signal SELECT to the entire network.

Each DIT then acts as indicated in 3a1.

Based on the rules given above, the broad outlines of the operation of the system according to the invention are as follows:

During the arbitration phase, any DIT, regardless of where it is located in the network and regardless of the location and number of a unit participating in the arbitration phase, is capable of predicting cases of potential or real conflict among these various units for taking over buses of the network. When such a conflict is considered possible, the DIT, after a brief delay period called $DELAY_1$, neutralizes the partial bus SCSI connected to its local interface by behaving with respect to it like a virtual SCSI unit assigned the highest priority: It then activates its signal BUSY and its identification signal $DID_7$. All units connected to this partial bus that are assigned a priority lower than priority 7 cease to participate in the arbitration.

Each DIT triggers a second delay period $DELAY_2$, whose duration is longer than the time necessary for stabilization of the signals in the entire network.

During the total duration of the two delay periods $DELAY_1$ and $DELAY_2$, each DIT records the state of the data lines, at its local and distant interfaces: This consequently enables it to determine where the unit, participating in the arbitration phase and which during that phase was assigned the highest priority, is located with respect to the local interface or distant interface of that DIT.

At this stage, two situations may arise, depending on whether or not the unit assigned the highest priority, 7, is connected to the network. If it is connected, the question also arises of whether or not it is participating in the arbitration phase.

In the case where the unit assigned the highest priority is participating in the arbitration phase, it takes control of the partial SCSI bus to which is connected (because it cannot be neutralized by a DIT acting as a virtual SCSI unit of priority 7); then, adhering to the SCSI standard, it initiates the selection phase by activating the selection signal SEL. This selection signal is propagated within the network; each DIT that observes the activation of the selection signal at one of its interfaces deduces from this that the entire network is under the control of a single unit. It then discontinues its ongoing delay period and ceases behaving like a virtual SCSI unit of priority 7. It then transmits the signals from one of its interfaces to the other.

If the unit assigned priority 7 is not participating in the arbitration phase, all the units of the network are neutralized by the DITs acting as virtual SCSI units of priority 7. At the end of the second delay period $DELAY_2$, each DIT is capable of determining where the unit assigned the highest priority (lower than 7) of those participating in the arbitration phase is located, with respect to the local or distant interface of that DIT, and which unit has as a result, as described above, been voluntarily neutralized by the DIT connected to the same partial bus.

Any DIT which locates this same unit at its distant interface does not change its state and keeps the partial bus to which it is connected neutralized. It waits for the activation of the selection signal SELECT at its distant interface before changing its state.

Contrarily, any DIT locating this same unit at its local interface stops behaving like a virtual SCSI unit of priority 7. It then releases the partial SCSI bus to which this same unit, assigned the highest priority less than 7, is connected.

Now that this same partial SCSI bus is released, any unit connected to it can participate in a new arbitration phase. All the DITs connected to this same partial bus remain neutral during that phase. In the event of conflict among several units attempting to take control of this same partial bus, this attempt is made at the local level, that is, at the level of this same bus, according to the provisions of the SCSI standard, since in effect all the units located at the other partial buses cannot intervene because they have been neutralized by the DITs that have continued to act as virtual units assigned the highest priority.

Consequently, the unit that takes control of the partial SCSI bus initiates the selection phase by activating the signal SELECT, which is propagated to the entire network. Each DIT then observes the activation of the signal SELECT at one of its interfaces and deduces from this that one unit has taken control of the network. It then becomes neutral with respect to the partial bus to which it is connected and assures the transfer of the data signals and control bit signals from one of its interfaces to the other.

At the end of the selection (or reselection) phase, each DIT is capable of locating the region where the unit of the initiator type and the unit of the target type involved in the future exchanges are located, with respect to each of the interfaces of that DIT.

It then determines what the directions of the transfers to come will be and assures the internal switching of the signals that its receives, as a function at the same time of the relative position of the units in question, and of the control bit signals managing these transfers.

Each DIT is capable of detecting the return of the entire network to the released state.

As a function of the broad outlines of operation of the network that have been described above, the ensuing description will make it possible to better understand the details of the sequence of the steps involved when a state machine ME of an intermediate transmission device DIT takes control of the network. To that end, the network $RE_1$ shown in FIG. 4 will be assumed to be simpler than the network RE of FIG. 2 and includes only three partial buses $SCSI_1$–$SCSI_3$. It is apparent that the sequence of the steps involved in taking control of the network is of the same type for the networks RE and $RE_1$.

A unit D of identification 1, or in other words having the degree of priority 1 (it will be recalled that priority 7 is the highest priority), is associated with the partial bus $SCSI_1$. The identification datum of the unit D is hereinafter called $DID_1$.

The intermediate transmission device $DID_1$, which includes a local interface $IL_1$ and a distant interface $ID_1$, is connected by way of its interface $IL_1$ to the partial bus $SCSI_1$ on the one hand and on the other to the point-to-point link $LPP_1$ by way of its distant interface $ID_1$. It is assumed that the link $LPP_1$ includes one link for transmission and one link for reception, each represented by an arrow in FIG. 4.

The intermediate transmission device $DIT_{21}$ is connected on the one hand to the link $LPP_1$ and on the other to the partial bus $SCSI_2$. The distant interface $ID_{21}$ of this same transmission device is connected to the bidirectional link $LPP_1$, while the local interface $IL_{21}$ of this same device is connected to the bus $SCSI_2$. Connected to this latter bus is a unit C of identification i differing from 1, 6 or 7. The identification datum of the unit C is hereinafter called $DID_i$.

Figure 4:
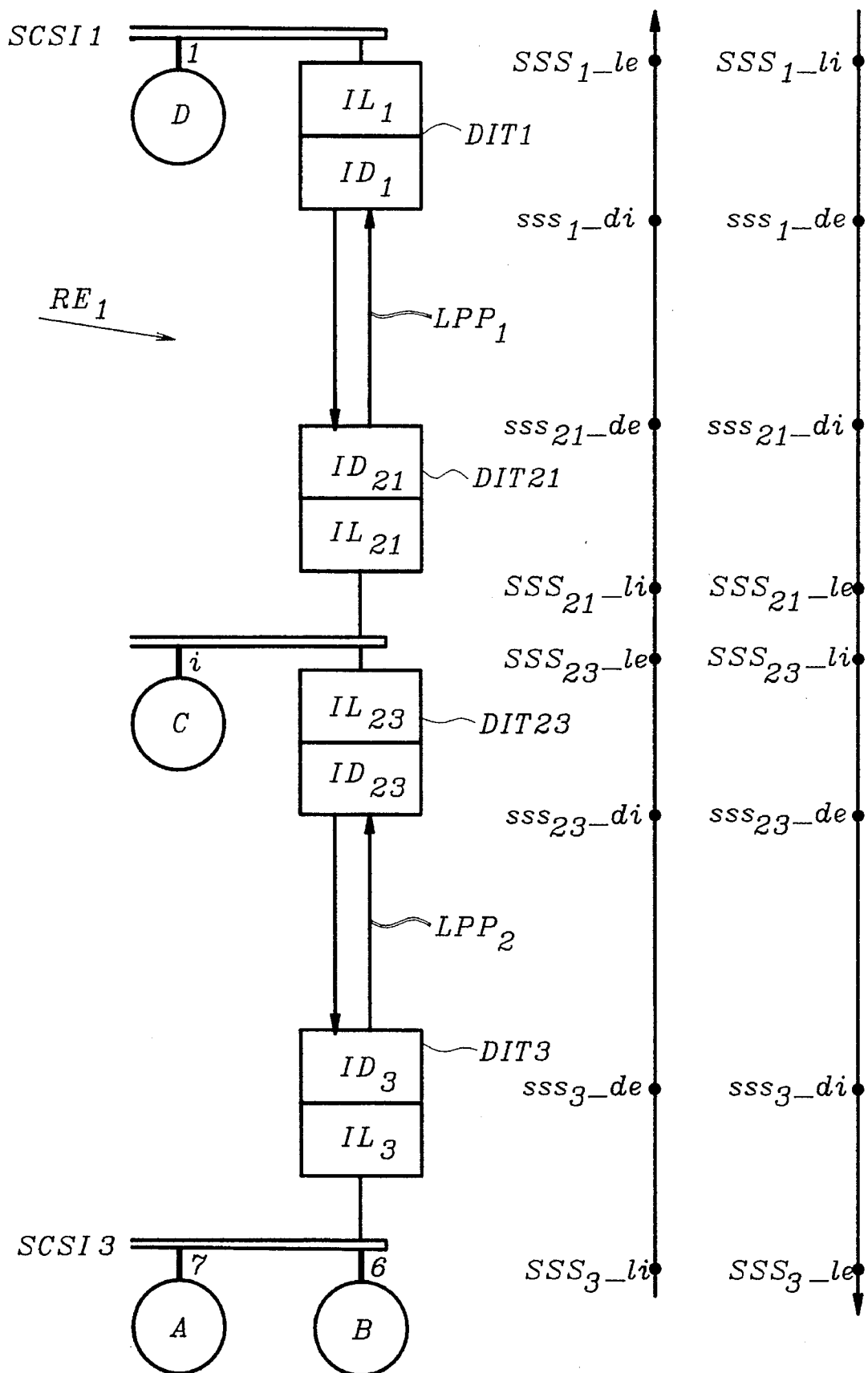
FIG. 4 shows a particular exemplary embodiment of a system of SCSI units according to the invention including three partial buses, and this figure also shows the progression of the signals from one partial bus to the other.

The intermediate transmission device $DIT_{23}$ is connected by way of its local interface $IL_{23}$ to the partial bus $SCSI_2$, while by way of its distant interface $ID_{23}$ it is connected to the bidirectional link $LPP_2$ (once again symbolized in FIG. 4 by two arrows in opposite directions). Connected to the latter is the intermediate transmission device $DIT_3$, by way of its distant interface $ID_3$. Its local interface $IL_3$ is connected to the partial bus $SCSI_3$. The two units, A having identification 7 and B having identification 6, are connected to this same bus. In the ensuing description, the identification datum of unit A is called $DID_7$, and the identification datum of unit B is called $DID_6$. In the right-hand part of FIG. 4, two arrows in opposite directions are seen, one pointing from bottom to top and one from top to bottom respectively indicating the name of the signals that pass from one unit to another, from the partial bus $SCSI_3$ and its associated units A and B to the unit D connected to the bus $SCSI_1$ on the one hand, and from this unit D and the partial bus $SCSI_1$ to the bus $SCSI_3$ and its associated units A and B, on the other hand.

Thus the set of signals received by $IL_3$ originating in the partial bus $SCSI_3$ is $SSS_3$-Li, while the set of signals transmitted by $ID_3$ is $sss_3$-de and the set of signals received by $ID_{23}$ is $sss_{23}$-di, and so forth, up to the signals sent via the interface $IL_1$ to the partial bus $SCSI_1$ which are called $SSS_1$-Le. Similarly, the set of signals transmitted by the unit D and arriving at the interface $IL_1$ is $SSS_1$-Li, the set of signals transmitted by $ID_1$ being $sss_1$-de, and so forth, up to the set of signals which travels on the bus $SCSI_3$, originating in the interface $IL_3$, which is called $SSS_3$-Le. For further detail, one may refer to FIG. 4. In addition, a more precise identification of the signals in the network $RE_1$ in FIG. 4 is given in Appendix 2, where the example given is with the signal BUSY, which is written as BSY or bsy depending on whether the signal is transmitted or received via a local or a distance interface.

Figure 5:
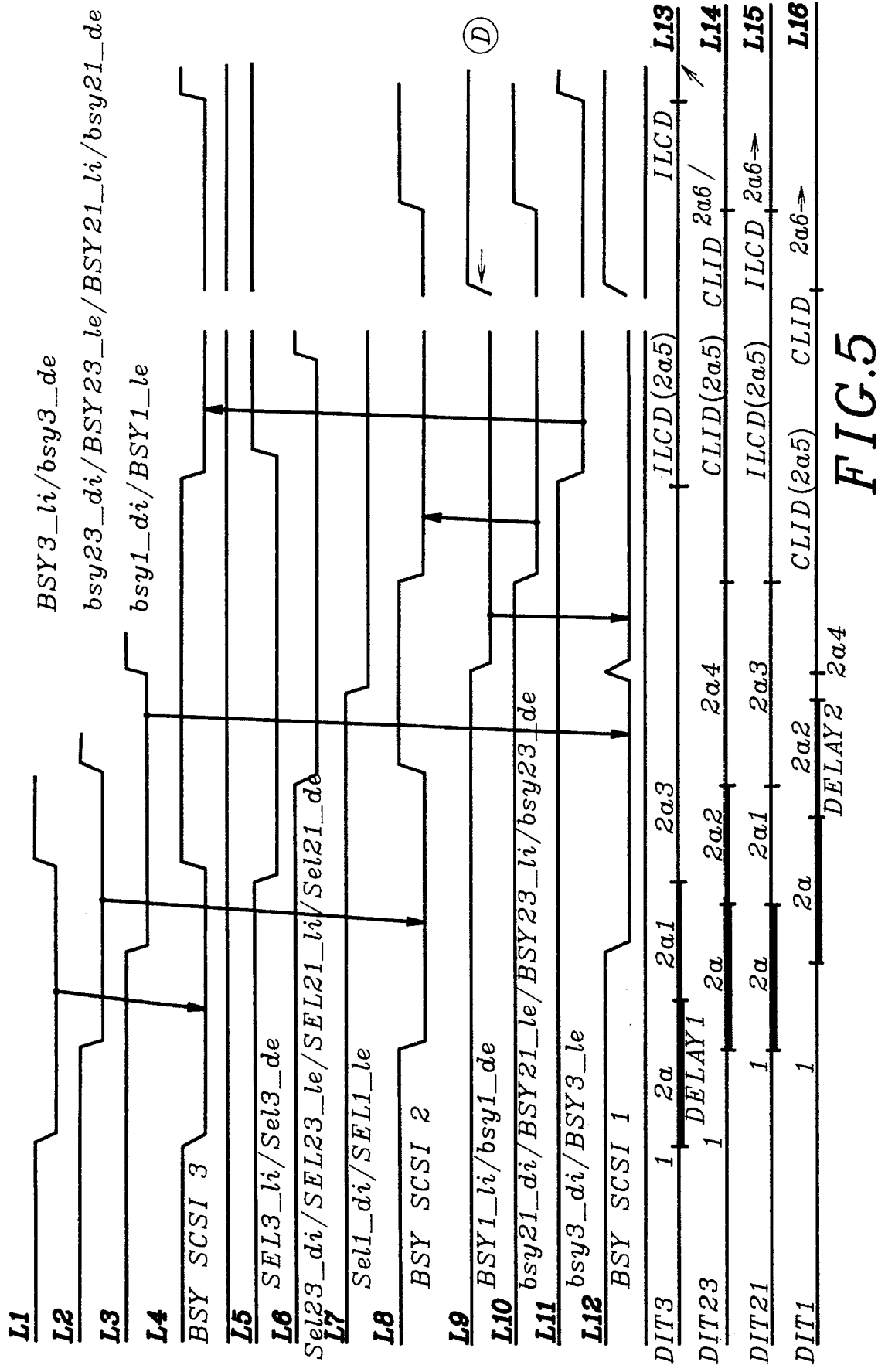
FIGS. 5, 6 and 7, illustrate the operation in various cases of the system shown in FIG. 4.
Figure 6:
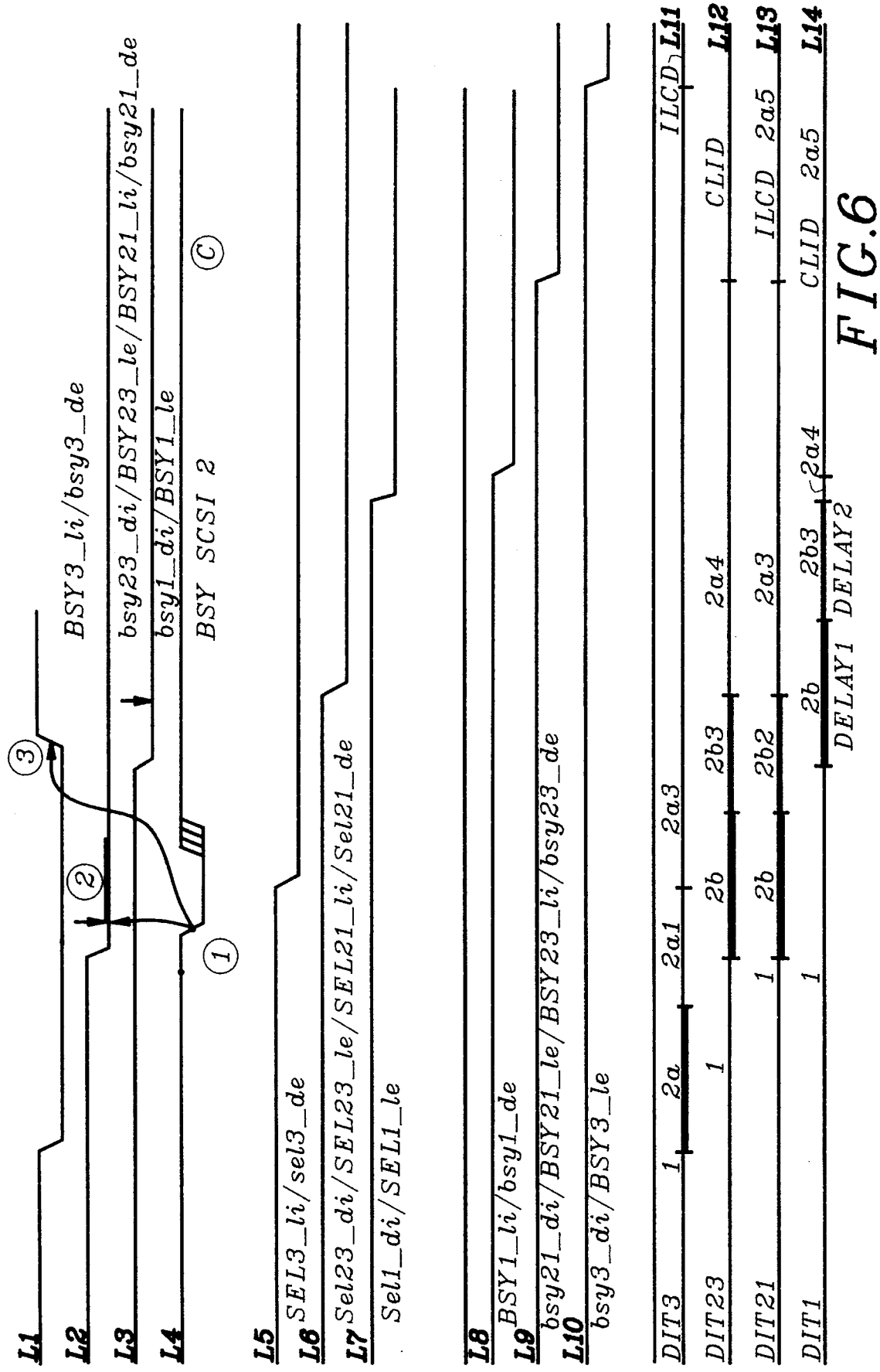
Figure 7:
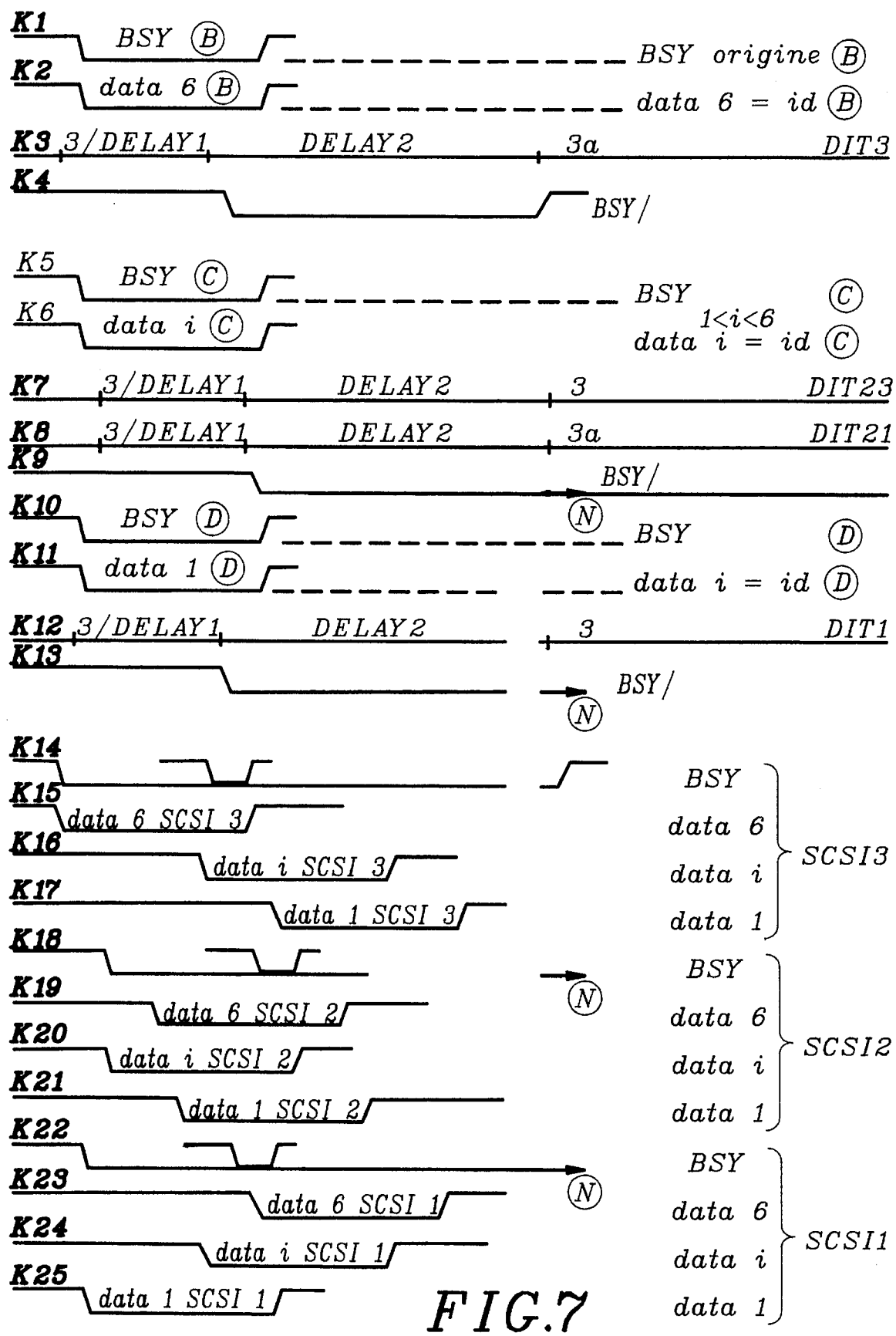

Turning now to FIGS. 5-8, they illustrate the sequence of the steps involved in taking control of the network $RE_1$ in FIG. 4, in three different cases which are the subject, respectively, of operations 2a–2a6 (FIGS. 5 and 8), 2b–2b3 (FIGS. 6 and 8), and finally 3a and 3b (FIG. 7 and FIG. 8).

The first case illustrated by FIGS. 5 and 8 will now be considered, which describes the sequence of the steps involved in taking control of the network when a single unit, such as unit A of identity 7 (which means that this unit has the highest priority in the entire network $RE_1$) seeks to work with unit D of identity 1 (the lowest priority in the entire network $RE_1$).

A certain number of hypotheses have been made, so that the flow chart of FIG. 5 can be shown in a more simplified form (this will, of course, also be true for the flow charts in FIGS. 6 and 7):

1) The transit times for the signals to pass through the intermediate transmission devices are considered to be zero. This makes it possible to have a single vertical plotted line for a plurality of signals, which in reality would be offset relative to one another over time, depending on the order in which they appear in the flow chart.

2) The identification signal $DID_7$ (which means that the identification signal DID=7, which indicates the highest priority) is assumed to accompany the signal BSY, which is the case for the first three plotted lines $L_1$–$L_3$ (the flow chart in FIG. 5 includes 16 different lines $L_1$–$L_{16}$).

The signals $DID_7$, $DID_1$, and the parity bit are assumed to accompany the selection signals SEL (lines $L_5$–$L_7$ in the flow chart of FIG. 5).

None of the aforementioned identification signals are shown in the flow chart of FIG. 5 (which of course will also be true for FIGS. 6 and 7), to make the flow chart easier to understand.

3) The period of activity of data transferred between the units A and D appears short in the flow chart of FIG. 5 (and of course in the flow charts of FIGS. 6 and 7 as well), but in reality this period of activity is much longer than the time necessary for arbitration and selection.

4) The flow chart of FIG. 5 (and FIGS. 6 and 7) does not attempt to represent the exact timing diagram of the SCSI standard, but has the purpose merely of giving some instructional idea of the sequence of the various operations of arbitration, selection transfer and return to the state of repose.

The operations of taking control are as follows:

1) The network is initially released: there is no activity. Each intermediate transition device takes note of the inactive signal BUSY (that is, BSY or bsy) on both its interfaces, both the local and the distant one.

2a) The unit A of identity 7 activates its signal BUSY for arbitration, a term that is used to mean the action that consists in intervening to take possession of the network $RE_1$ and sending signals to it or receiving them from it. This signal BUSY is represented on line $L_1$ and its name is $BSY_3$-Li.

$L_4$ represents the signal BSY on the bus $SCSI_3$, which is both the signal $BSY_3$-Li and the signal $BSY_3$-de; that is, it represents the signal BUSY on both interfaces $IL_3$ and $ID_3$ of the intermediate transition device $DIT_3$. In general, all the signals shown on lines $L_1$–$L_2$ in FIG. 5 belong to the representation system that has been defined in FIG. 4 and in Appendix 2. This line $L_1$ represents the signals at the interfaces $IL_3$ and $ID_3$ of the transmission device $DIT_3$, line $L_2$ the signals to the interfaces $IL_{23}$ and $ID_{23}$, $IL_{21}$ and $ID_{21}$ of the intermediate transmission devices $DIT_{23}$ and $DIT_{21}$, line $L_3$ the signals at the interfaces $IL_1$ and $ID_1$ of the intermediate transmission device $DIT_1$, the line $L_4$ the signal BUSY on the bus $SCSI_3$, the line $L_5$ the selection signals at the local and distant interfaces of the intermediate transmission device $DIT_3$, the line $L_6$ the selection signals at the local and distant interfaces of the intermediate transmission devices $DIT_{23}$ and $DIT_{21}$, line $L_7$ the selection signals at the local and distant interfaces of the intermediate transmission device $DIT_1$, line $L_8$ the signal BUSY on the bus $SCSI_2$, and lines $L_9$–$L_{11}$ the signals of the BUSY type on the local and distant interfaces of the transmission devices $DIT_3$, $DIT_{23}$, $DIT_{21}$, $DIT_1$, and line $L_{12}$ the signal BUSY on the bus $SCSI_1$. The arrows that connect the lines $L_1$ and $L_4$, $L_2$ and $L_8$, and $L_3$ and $L_{12}$ means that the signals shown on these lines are identical. Obviously, the same is true for the lines $L_9$ and $L_{12}$, $L_{10}$ and $L_8$, and $L_{11}$ and $L_4$.

As soon as the unit A has activated its signal BUSY, the intermediate transmission device closest to it, in this case the device $DIT_3$, observes the signal of the BUSY type becoming active (line $L_1$) at its local interface IL13. It transmits this signal to its distant interface $ID_3$ while triggering the beginning of the delay period $DELAY_1$, which lasts on the order of one microsecond (this period is an internal delay in the intermediate transmission device) and at the same authorizes the memorization of the state of the data signals at its two interfaces. The signal of the BUSY type transmitted by the unit A is transmitted gradually to the entire network.

At the level of each intermediate transmission device, this signal arrives at either the distant interface or the local interface. Hence at $DIT_{23}$, the signal arrives at the distant interface, while for $DIT_{21}$ it arrives at the local interface, and for $DIT_1$ it arrives at the distant interface. Each intermediate transmission device observes the signal BUSY of one of its interfaces becoming active and transmits it to the other, triggers its own delay period $DELAY_1$, and authorizes the memorization of the data signals of its two interfaces. This is illustrated by the lines $L_1$–$L_3$, $L_9$–$L_{11}$, and $L_4$, $L_8$, $L_{12}$. After a period of time that depends on the physical characteristics of the network, the signal BUSY is in the active state on each of the partial buses $SCSI_1$–$SCSI_3$ (see lines $L_4$, $L_8$, $L_{12}$).

At the end of the prior $DELAY_1$, and in each of the intermediate transmission devices that have detected the activation of BSY-Li at their local interface IL, a shift is made from step $2a$ to step $2a1$, and the state machine shifts from state 1 to the state 1A, shown in lines $L_{13}$ and $L_{15}$ of FIG. 5.

At the end of the period $DELAY_1$ and in each of the DITs that have detected the activation of BSY-di at their distant interface ID, a shift is made from step $2a$ to $2a2$, and the state machine shifts from state 1 to state 2, shown on lines $L_{14}$ and $L_{16}$ of FIG. 5.

2a1) At the time of this operation, all the intermediate transmission devices DIT which have detected the activation of the signal BUSY at their local interface and which have memorized the only active data signal $DID_7$ begin to wait for the selection signal SEL on their local interface, as provided by the SCSI standard. Their state machine is then in state 1A, shown on lines $L_{13}$ and $L_{15}$ of FIG. 5.

2a2) At the time of this operation, all the intermediate transmission devices that have detected the activation of the signal BUSY at their distant interface (devices $DIT_{23}$ and $DIT_1$) trigger a delay period called $DELAY_2$ and continue memorizing the data signals at their two respective interfaces, seen on lines $L_{14}$ and $L_{16}$ in FIG. 5. In addition, each of them behaves with respect to its local bus (in this case $SCSI_2$ and $SCSI_1$) like a normal SCSI-type unit of identity 7 by activating the signal BUSY and the data signal of identity 7 (that is, the one having the highest priority) on this same bus. This last action makes it possible to temporarily refuse to allow control of these local buses ($SCSI_2$ and $SCSI_1$) to be taken by any potential requesting unit on these same buses (that is, units other than A). The period $DELAY_2$ has a duration that in the exemplary embodiment described here is more than twice as long as the longest time that the signals take to traverse the route between two units located on partial buses separate from one another. At the time of this operation $2a2$, the state machine of the intermediate transmission devices involved in this operation is in state 2.

2a3) At the end of the arbitration phase, that is, at the end of operation $2a1$, defined in the SCSI standard, the unit A activates its selection signal SEL (line $L_5$). The intermediate transmission device $DIT_3$ is the first one to detect the selection signal, in this case $SEL_3$-Li, on its local interface $IL_3$. It transmits it to its distant interface $ID_3$ along with the associated data and parity signals (signal $DID_7$, plus $DID_1$, which is the identification signal of the target unit, that is, unit D, plus the parity bit associated with the 8-data-bit configuration).

It then waits for the deactivation of the signal BUSY on the local bus $SCSI_3$, and then waits for either its reactivation (in FIG. 5, it can be seen that the local busy signal shown in line $S_4$, is active a first time and then is active a second time toward the right-hand part of the drawing figure) or the activation of the distant signal BUSY (which can be sent via the unit D, for example). The selection signal SEL is then sent gradually to the entire network $RE_1$, as far as the unit D. The intermediate transmission devices which observe the activation of their selection signal SEL on the local interface, such as $DIT_3$ and $DIT_{21}$, operate in the same way. The state machine is in the state $S_1$, shown in lines $L_{13}$ and $L_{15}$ in FIG. 5.

2a4) At the time of this operation, the intermediate transmission devices which observe the activation of their selection signal SEL on their distant interface (in this case, $DIT_{23}$ and $DIT_1$) stop the ongoing delay period $DELAY_2$. They stop behaving as an SCSI unit of identity 7. They transmit the selection signal and the data and parity signals associated with their distant interface to their local interface. They then wait for the deactivation of their distant signal BUSY and then its possible reactivation or the activation of their local signal BUSY. Their state machine is in the state $S_2$, shown on lines $L_{14}$ and $L_{16}$ in FIG. 5.

2a5) At the time of this operation, the unit A deactivates its signal BUSY after having activated its selection signal SEL; one may refer to lines $L_1$ and $L_5$, for example, where it can be seen that the selection signal $SEL_3$-Li is activated shortly before the signal shown in line $L_1$, that is, BSY-Li, is deactivated. This is also provided for in the SCSI standard.

The unit D that A seeks to select finds itself urged by this latter unit, when it simultaneously observes that the selection signal and the data signal carrying its own identity, that is, $DID_1$, are active (this involves the signal $SEL_1$-Le in this case). It must also at the same time observe the data signal bearing the identity of A, that is, $DID_7$. It then in turn activates its own signal BUSY, that is, the signal BSY-Li shown on line $L_9$. This latter signal is transmitted to the entire network $RE_1$ by way of all the transmission devices and the point-to-point lines shown in FIG. 4. Each intermediate transmission device compares the respective origins of the selection signal and of the last signal of the BUSY type that was activated.

If the origins of both these signals are identical, that is, if they originate in the same local or distant interface, the device DIT in question deduces from this that it need not be concerned with the future activity of A on its partial bus $SCSI_3$ and that the data transfers to come do not concern it.

Its role is then limited to the transfer of the signal BUSY from one of its interfaces to the other. In that case, the state machine of the intermediate transmission device shifts from state $S_1$ to the state VL, which signifies that the initiator unit, in this case A, and the target unit B are connected to the same local interface of the intermediate transmission device, in this case $IL_3$ connected to the partial bus $SCSI_3$. In that case, the situation is case I shown in FIG. 8.

If the origins of the selection signal and the last BUSY signal activated are opposite, then the situation is one of the following cases II–V (shown in FIG. 8):

II. The local initiator unit, in this case A, selects a distant target: The state machine of the intermediate transmission device then shifts from state $S_1$ to the state ILCD, which stands for local initiator/distant target, shown on lines $L_{13}$ and $L_{15}$ in FIG. 5.

III. A distant target reselects a local initiator, in this case A. The intermediate transmission device sees its state machine change from state $S_2$ to state ILCD.

IV. A local target reselects a distant initiator; the state machine of the intermediate transmission device shifts from state $S_1$ to state CLID, which stands for local target/distant initiator.

V. The distant initiator selects a local target: The state machine of the DIT shifts from state $S_2$ to state CLID, shown on lines $L_{14}$ and $L_{16}$ in FIG. 5.

In the case of II–V, the role of the DIT accordingly constants, once it is in the state ILCD or CLID, of assuring the transfer of all the signals in the appropriate direction provided by the protocol of the SCSI standard.

VI. If the origins of the selection signal and the last signal BUSY activated are identical, that is, if they originate in the same distant interface of the intermediate transmission device, the state machine of the latter changes from state $S_2$ to the state VD.

2a6) At the time of this operation, each device DIT continually observes the state of the signal BUSY that it receives. If the signal is deactivated, the DIT deduces from this that the activity that was being performed is being terminated. It then puts its own indicators in the state of repose and is ready to participate again in managing the taking of control of the network, in response to some future request by any of the units of the network. It can thus be seen, turning to FIG. 8, that at that time of this operation 2a6, a shift is made from one of the states VL, ILCD, CLID or VD to the initial state of repose.

The second case of taking control of the network will now be considered, in the case where a plurality of units are simultaneously participating in arbitration, assuming that among these units is the unit A of identity 7 as in all the operations 2a1–2a6.

The description now turns to FIGS. 6 and 8, it being understood that FIG. 6 must be studied jointly with FIG. 5.

Each unit participating in the arbitration activates its own signal BUSY in the time provided for this by the SCSI protocol, with respect to the free state of the partial bus to which it is connected. Each DIT observes the activation of the signal BUSY at its two interfaces. It assures the transmission of this signal by a rule of priority (the first signal BUSY that originates in it is transmitted, while the second one is not, or is transmitted only later). It triggers its own delay period $DELAY_1$ and authorizes the internal memorization of the data signals of its two interfaces.

For better comprehension of how the various operations on this second type of situation proceed, it is assumed that it is units A and C that are taking part in the arbitration. Let it be assumed that A has priority, with $DID_7$ being active. In turn, unit C has an identification bit subscripted i, which is a number less than 7. The unit A arbitrates first, and it targets the unit D whose identifier is $DID_1$. Having found the bus $SCSI_2$ free at $E_1$ (see line $L_4$ in FIG. 6), the unit C attempts the arbitration. The data bit $DID_i$ that assigns it its identification is propagated to one and the other of the two partial buses $SCSI_1$ and $SCSI_3$, which it reaches at $E_3$ (line $L_1$ in FIG. 6). Since the unit C has a lesser degree of priority than the unit A, it is the loser in the arbitration process, and it deactivates its signal BUSY and its identification datum $DID_i$. However, this datum is memorized in the three devices $DIT_{23}$, $DIT_{21}$ and $DIT_1$.

The various transmission devices then behave as follows:

2b) Each DIT that terminates the delay period $DELAY_1$, having observed only the identification datum $DID_7$ become active at its local interface IL, is in the situation defined in 2a1.

In the example here in FIGS. 4 and 6, only $DIT_3$ is in this case: It has triggered the period $DELAY_1$ at the time of the activation of the identification datum $DID_7$ at its local interface $IL_3$ and has terminated the period $DELAY_1$ before having observed the activation of the identification datum $did_i$ at its distant interface $ID_3$, line $L_{11}$ in FIG. 6.

Later observation of the activation of the identification datum $did_i$ at its distant interface $ID_3$ has no effect from the moment when the state machine is in the state 1A.

After that, the unit A having taken control of the local bus $SCSI_3$ (A has the highest priority), activates the signal SELECT, in this particular case the signal $SEL_3$-Li, as well as the identification data signals $DID_7$ (its own) and $DID_1$ (that of the target unit). The activation of $SEL_3$-Li observed by $DIT_3$ brings about the evolution in the latter of the state machine, which changes from the state 1A to the state S1, in accordance with the situation defined in 2a3, shown on lines $L_5$ and $L_{11}$ in FIG. 6.

2b1) Each DIT that terminates the period $DELAY_1$, having observed the activation of more than one identification datum signal on its local interface IL, or having observed the activation of at least one identification datum signal at its distant interface ID, triggers its delay period $DELAY_2$, and its state machine shifts from state 1 to state 2.

During the activation time of the period $DELAY_2$, the memorization of the identification data signals of the local and distant interfaces is maintained.

$DIT_{21}$ is in the first case discussed, because at the end of the period $DELAY_1$ it has observed the activation of the identification data signals $DID_7$ and $DID_i$ on its local interface, seen in line $L_{13}$ in FIG. 6.

$DIT_{23}$ and $DIT_1$ are in the second case discussed, because at the end of their respective delay period $DELAY_1$, $DIT_{23}$ has observed the activation of the identification datum $did_7$ at its distant interface $ID_{23}$ (line $L_{12}$ in FIG. 6), and $DIT_1$ has observed the activation of the identification datum $did_7$ or $did_i$, or both, at its distant interface $ID_1$ (line $L_{14}$ in FIG. 6).

The signal SELECT and the identification data signals $DID_7$ and $DID_i$ activated by the unit are propagated to the network.

2b2) Each DIT whose state machine is in the state 2 and which observes the activation of the signal SELECT at its local interface causes its state machine to shift from state 2 to state S1.

Furthermore, it assures the transmission of the signal SELECT and of the identification signals $DID_7$ and $DID_i$ from its local interface IL to its distant interface ID.

In the example in question, in FIGS. 4 and 6, $DIT_{21}$ is in the case discussed above. It observes the activation of the signal $SEL_{21}$-Li at its local interface $IL_{21}$; see lines $L_6$ and $L_{13}$ in FIG. 6.

2b3) Each DIT whose state machine is in state 2 and which observes the activation of the signal SELECT at its distant interface ID causes its state machine to shift from state 2 to state S2.

It also assures the transmission of the signal SELECT and of the identification data signals $did_7$ and $did_i$ from its distant interface to its local interface IL.

In the example of FIGS. 4 and 6 in question, $DIT_{23}$ and $DIT_1$ are in this case. They observe the activation of the signal SELECT at their distant interface, that is, $Sel_{23}$-di for $DIT_{23}$ and $Sel_1$-di for $DIT_1$, respectively; see FIG. 6, lines $L_{12}$ and $L_6$ for $DIT_{23}$ and FIG. 6, lines $L_{14}$ and $L_7$ for $DIT_1$.

The unit A that meets the SCSI protocol keeps $SEL_3$-Li, $DID_7$ and $DID_1$ active and deactivates $BSY_3$-Li. It waits for the response of the targeted apparatus, which must activate $BSY_1$-Li.

The targeted apparatus finds itself selected and activates the signal $BSY_1$-Li, which is propagated in the network. The various DITs of the network evolve in accordance with the situations described in section 2a5.

3) Turning now to FIG. 7 and FIG. 8, the third case of taking control of the network will be considered, where arbitration is attempted by one or more units having a priority less than the highest priority of 7. Each transmission device triggers the period $DELAY_1$ as soon as its detects the signal BUSY present at one of its interfaces. It transmits this signal to its other interface. It authorizes the memorization of the data signals thereof. At the end of the period $DELAY_1$, it triggers $DELAY_2$, maintains the authorization of memorization of the data signals, and then activates the signal BUSY and the data signal 7 at its local interface, in order to make any unit located on the bus associated with this local interface lose control of the network. At the end of the period $DELAY_2$, each transmission device compares the data signals of its two interfaces (memorized during $DELAY_1$ and $DELAY_2$). It determines which interface, local or distant, that the unit associated with the data signal with the highest-priority identity that was active during one or the other of these two delay periods belongs to. At the time of this third case, the state machine of the transmission devices changes from state 2 to state 3 (see FIG. 8).

3a) If the unit associated with the data signal having the highest-priority identity is located on the local bus, any transmission device located on this local bus stops behaving like a unit having the highest priority relative to its own local bus. This latter bus becomes released. Any of the units located on this bus can arbitrate. The unit that has taken control of the local bus activates its selection signal. The operations for this transmission device have the sequence indicated for the device $DIT_3$ in section 2a3. The state machine of this transmission device then shifts from state 3 to state 4 and then to state $S_1$.

3b) The unit with the highest identity is located on one of the distant buses; the corresponding DIT stops memorizing data signals. It keeps the signal BUSY active at its local interface and then goes to a state of waiting for the selection signal at its interface. When it observes that the distant selection signal at its distant interface is active, it operates as indicated in section 2a4.

For better comprehension of operations 3a and 3b discussed above, the more-detailed example will be considered, in which three units are attempting arbitration and none of them have the highest-priority identification in the network. By way of example, these units are unit B (See FIG. 4) having identification 6; unit C of identification i, where i is between 1 and 6, and finally, unit D of identification 1. The targeted unit is unit A with identification 7, for example. The behavior of the various transmission devices DIT at the end of their respective delay periods $DELAY_2$ is as follows, turning to FIG. 7, which includes lines $k_1$ through $k_{25}$.

The transmission device $DIT_3$ memorizes the data signals of identification 6 at its local interface and the data signals of identification i and 1 at its distant interface. Since the identification of the corresponding local unit (B) equals 6 and is greater than i, which is the identification of distant units, its behavior is that of step 3a, as can be seen from line $k_3$.

The device $DIT_{23}$ memorizes the identification signal 6 at its distant interface and the identification signals i and 1 at its local interface. The identification of the distant unit is greater than the identification i or 1 of the units connected to its associated local bus, and so it behaves in accordance with step 3b (see line $k_7$ in FIG. 7).

The transmission device $DIT_{21}$ memorizes the identification signals 6 and i and at its local interface the identification signal 1 at its distant interface. Since its identification of the local unit equals 6, and is greater than the identification of the distant unit 1, it behaves in accordance with step 3a; see line $k_8$ in FIG. 7.

The transmission device $DIT_1$ memorizes the identification signals 6 and i at its distant interface and the identification signal 1 at its local interface. Since the identification 6 of the distant unit is greater than the identification1 of its local unit, it behaves in accordance with steps 3b (line $k_{12}$ in FIG. 7).

It will be noted that at the end of their respective periods $DELAY_2$, the transmission devices $DIT_3$ and $DIT_{21}$ cancel the forcing of their respective signals BSY and $DID_7$, but only the partial bus $SCSI_3$ is freed, because the partial bus $SCSI_2$ is itself occupied by the transmission device $DIT_{23}$. The only partial bus that is freed is accordingly the one to which the unit having the highest identification among the set of units that have attempted arbitration is connected. FIG. 7 is limited to showing the signals at the time of the arbitration phase, because the selection phase that follows is identical to that which proceeds following a unique selection, as is indicated in FIGS. 5 and 6.

Appendix 1
SIGNALS UNDER THE CONTROL OF THE STATE MACHINE
Incident signal = signal received at time t; suffix i
Transmitted signal = signal being transmitted by DIT; suffix e
Memorize signal = temporarily memorized; suffix m
Signal from/to local SCSI bus; suffix L
Signal from/to distant SCSI bus; suffix d
List of signals:

| Local interface | | Distant interface | | |
|---|---|---|---|---|
| Incident | Transmitted | Incident | Transmitted | |
| RST_Li | RST_Le | rst_di | rst_de | reset |
| BSY_Li | BSY_Le | bsy_di | bsy_de | busy |
| SEL_Li | SEL_Le | sel_di | sel_de | select |
| ATN_Li | ATN_Le | atn_di | atn_de | attention |
| C/D_Li | C/D_Le | c/d_di | c/d_de | commande/data |
| I/O_Li | I/O_Le | i/o_di | i/o_de | input/output |
| MSG_Li | MSG_Le | msg_di | msg_de | message |
| *REQ_Li | REQ_Le | req_di | req_de | request |
| *ACK_Li | ACK_Le | ack_di | ack_de | acknowledge |
| Dxy_Li | Dxy_Le | dxy_di | dxy_de | data bit xy |
| | | | | xy = 00 to N-1 |
| | | | | N = 08 : SCSI 8 bits |
| | | | | N = 16 : SCSI 16 bits$^r$ |
| | | | | N = 32 : SCSI 32 bits |
| DPz_Li | DPz_Le | dpz_di | dps_de | parity bit, |
| | | | | byte z; z = 0 to 3 |
| SSS_Li | SSS_Le | sss_di | sss_de | set of all the signals |
| | | | | of the SCSI bus |
| CCC_Li | CCC_Le | ccc_di | ccc_de | Nine check bit signals |
| | | | | of the SCSI bus |

*These signals are double in the 32-bit SCSI bus. The 32-bit SCSI bus has not yet been fully defined. For it, the list of signals given here is not exhaustive.

Appendix 2
Identification of signals in the network RE1 of FIG. 4
The signals are identified with respect to the
local and distant DIT interfaces.

| Transmitter | Receiver | Reception Identification | Transmission Identification |
|---|---|---|---|
| Example of signal BSY transmitted from A or B | | | |
| A or B | $DIT_3$ $IL_3$ | $BSY_3\_Li$ | — |
| $DIT_3$ $ID_3$ | $DIT_{23}$ $ID_{23}$ | $bsy_{23}\_di$ | $bsy_3\_de$ |
| $DIT_{23}$ $IL_{23}$ | $DIT_{21}$ $IL_{21}$ | $BSY_{21}\_Li$ | $BSY_{23}\_Le$ |
| | C | $BSY_{21}\_Li$ | $BSY_{23}\_Le$ |
| $DIT_{21}$ $ID_{21}$ | $DIT_1$ $ID_1$ | $bsy_1\_di$ | $bsy_{21}\_de$ |
| $DIT_1$ $IL_1$ | D | — | $BSY_1\_Le$ |
| Example of signal BSY transmitted from D | | | |
| D | $DIT_1$ $IL_1$ | $BSY_1\_Li$ | — |
| $DIT_1$ $ID_1$ | $DIT_{21}$ $ID_{21}$ | $bsy_{21}\_di$ | $bsy_1\_de$ |
| $DIT_{21}$ $IL_{21}$ | $DIT_{23}$ $IL_{23}$ | $BSY_{21}\_Le$ | $BSY_{23}\_Li$ |
| | C | " | " |
| $DIT_{23}$ $ID_{23}$ | $DIT_3$ $ID_3$ | $bsy_3$-di | $bsy_{23}\_de$ |
| $DIT_3$ $IL_3$ | A, B | — | $BSY_3\_Le$ |

We claim:

1. A system of a maximum of N SCSI units (A, B, C, D, . . .) distributed in a network (RE) operating by a SCSI PROTOCOL in which a length of a bus, ($SCSI_1$, $SCSI_2$, $SCSI_3$) used to interconnect a plurality of SCSI units is limited to a standard maximum value, and the SCSI units are spaced at a distance which is greater than said standard maximum value, said system comprising a plurality of local partial buses ($SCSI_1$–$SCSI_3$) connected to one another via bidirectional point-to-point links ($LPP_1$, $LPP_2$), intermediate transmission devices ($DIT_1$, $DIT_{21}$, $DIT_{23}$, $DIT_3$) for managing said links, each of said devices being connected both to a partial bus and to a point-to-point link, wherein said point to point links operate in accordance with a modified SCSI protocol which takes into account lengthening of propagation time of signals on the network, wherein each transmission device ($DIT_1$, $DIT_{21}$, etc.) includes a first interface (IL) for connection with an associated partial bus, a second interface (ID) for connection with an associated bidirectional link (LPP), a central portion (ME) managing transfers of data from the partial bus to the link and vice versa, each partial bus ($SCSI_1$, $SCSI_2$, etc.) functioning in accordance with a predetermined SCSI standard, wherein the central portion is a state machine that assures management of gaining control of a network ($RE_1$) on a part of any unit (A, B, C, D, . . . ) belonging to the network as a function of signals appearing at the first and second interfaces (IL, ID), said transmission devices being spaced at a distance which is greater than said standard maximum value, and further wherein an arbitration phase is defined by the SCSI standard and is used locally by each state machine (ME) at a level of the partial bus ($SCSI_1$, $SCSI_2$, . . . ) associated with the corresponding intermediate transmission device ($DIT_1$, $DIT_{21}$, $DIR_{23}$, $DIR_3$), the latter being a virtual SCSI unit assigned a highest priority for its own associated partial bus during phases of arbitration and selection defined by the SCSI standard, the state machine (ME) including means for detecting the beginning of an arbitration phase and means for neutralization acting upon the first interface to prevent any SCSI unit connected to the associated partial bus from gaining control of the network, as soon as the detecting means have detected the beginning of an arbitration phase, and further wherein each unit assigned the highest priority includes means for outputting a selection signal as soon, while participating in the arbitration phase, as it has gained control of the bus to which it is connected, the state machine including means for detecting the selection signal for releasing the first interface and transmitting the selection signal to the second interface, and further wherein the state machine includes means for memorizing, during a predetermined delay, a degree of priority of the SCSI units seeking to gain control of the network.

2. A method for employing a system of a maximum of N SCSI units (A, B, C, D, . . . ) distributed in a network (RE) operating by a SCSI PROTOCOL in which a length of a bus, ($SCSI_1$, $SCSI_2$, $SCSI_3$) used to interconnect a plurality of SCSI units is limited to a standard maximum value., and the SCSI units are spaced at a distance which is greater than said standard maximum value, said system comprising a plurality of local partial buses ($SCSI_1$–$SCSI_3$) connected to one another via bidirectional point-to-point links ($LPP_1$, $LPP_2$), intermediate transmission devices ($DIT_1$, $DIT_{21}$, $DIT_{23}$, $DIT_3$) for managing said links, each of said devices being connected both to a partial bus and to a point-to-point link, wherein said point-to-point links operate in accordance with a modified SCSI protocol which takes into account lengthening of propagation time of signals on the network, said method comprising the steps of:

1) detecting, through use of intermediate transmission devices, a beginning of an arbitration phase, and then acting upon a local interface to neutralize any SCSI unit that would wish to take control of the network;

2a) when a unit which is assigned a highest priority (priority 7) participates in the arbitration phase, taking control of the partial bus to which the unit is connected and initiating a selection phase by outputting a selection signal;

2a1) stopping said acting on the local interface of each intermediate transmission device that detects the beginning of the selection phase and neutralizing a intermediate transmission device with respect to the selection phase; to thereby allow the transmission of all signals from a first interface to a second interface and vice versa.

3. The method of claim 2, characterized in that 2b) when a unit assigned the highest priority is not participating in the arbitration phase, each intermediate transmission device neutralizes a partial bus associated with the transmission device thereby prohibiting to each unit a control of the corresponding bus and observes a predetermined delay ($DELAY_1$) during which the transmission device memorizes information on units that seek to take control of the network;

2c) at the end of said predetermined delay, releasing the partial bus of the network that has been recognized as being connected to the unit that is participating in the arbitration phase and that during that phase has the highest priority by the intermediate transmission device with which the partial bus is associated; and 2d) attempting to take control of the partial bus by each unit located on the partial bus that has been released and when the attempt is successful propagating the selection signal output by said unit to the entire network.

* * * * *